Sept. 6, 1966  A. E. BEESLEY ETAL  3,271,048
SULKY VEHICLE ATTACHMENT FOR BICYCLES
Filed Dec. 21, 1964  2 Sheets-Sheet 1

Albert E. Beesley
Jack R. Hitchcock
INVENTORS

BY Clarence A. O'Brien
and Harvey B. Jacobson
Attorneys

Sept. 6, 1966  A. E. BEESLEY ETAL  3,271,048
SULKY VEHICLE ATTACHMENT FOR BICYCLES
Filed Dec. 21, 1964  2 Sheets-Sheet 2

Albert E. Beesley
Jack R. Hitchcock  INVENTORS

BY *Clarence A. O'Brien*
and *Harvey B. Jackson*
Attorneys

United States Patent Office 3,271,048
Patented Sept. 6, 1966

3,271,048
SULKY VEHICLE ATTACHMENT FOR BICYCLES
Albert E. Beesley, 2609 Cheyenne, and Jack R. Hitchcock, 2941 Azalea, both of Pueblo, Colo.
Filed Dec. 21, 1964, Ser. No. 419,790
10 Claims. (Cl. 280—204)

This invention generally relates to new and useful improvements in trailers of the two wheel or sulky type particularly for children and has for its primary object to provide, in a manner as hereinafter set forth, a vehicle of this character which is adapted to be expeditiously hitched to a conventional bicycle to be towed thereby.

Another important object of the present invention is to provide an improved trailer or sulky of the aforementioned character comprising a construction and arrangement of parts which is such that most of the weight is balanced on and carried by the two wheels of the vehicle.

Still another important object of the invention is to provide an improved bicycle trailer or sulky of the character set forth which includes unique means for detachably hitching the vehicle to a bicycle for universal swinging movement and, furthermore, in such a manner as to interfere in no way with the operation of the bicycle.

Another object is to provide a trailer or sulky of the character set forth which embodies a novel out of the way compartment for carrying luggage, lunch baskets, blankets, etc.

Another object is to provide a bicycle trailer or sulky which is adapted to pass freely through gates and doorways of standard width.

Other objects are to provide an improved trailer of the aforementioned character which is comparatively simple in construction, strong, durable, compact, of light weight, safe, attractive in appearance and which may be manufactured at low cost.

These together with other objects and advantages which will become subsequently apparent reside in the details of construction and operation as more fully hereinafter described and claimed, reference being had to the accompanying drawings forming a part thereof, wherein like numerals refer to like parts throughout, and in which:

Figure 1:
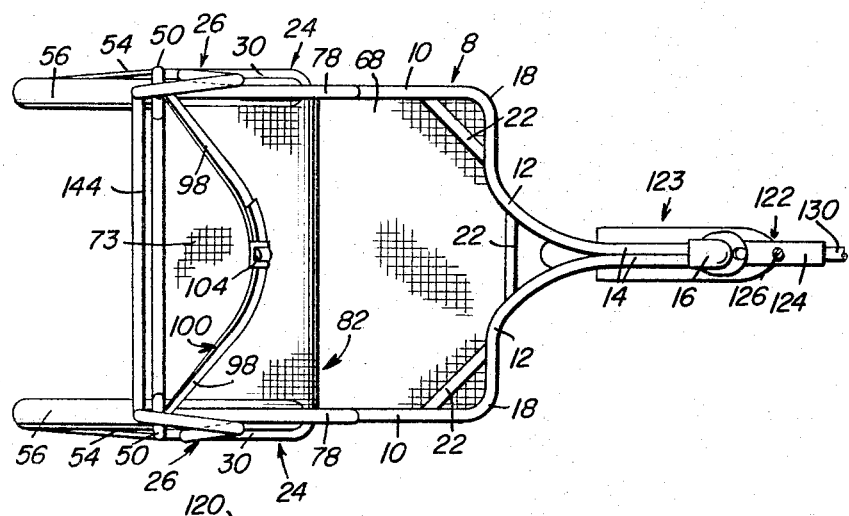
FIGURE 1 is a top plan view of a trailer constructed in accordance with the present invention.
Figure 2:
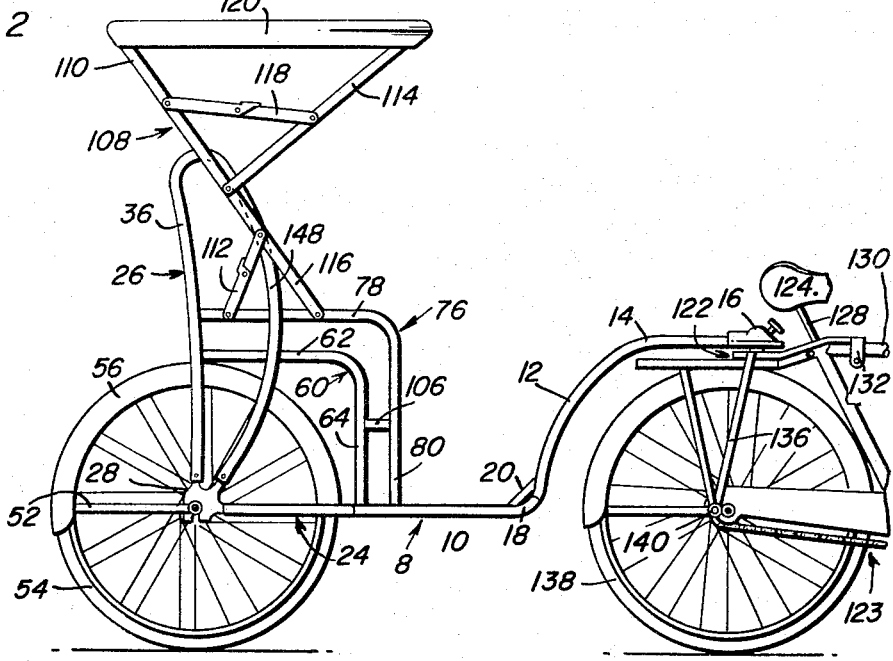
FIGURE 2 is a view in side elevation thereof, showing the device hitched to a bicycle.
Figure 4:
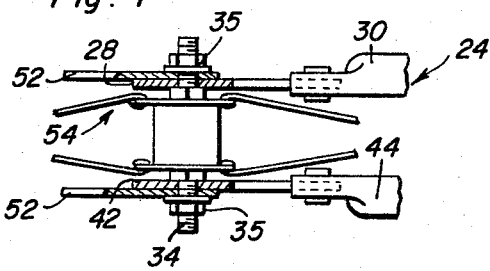
FIGURE 4 is a fragmentary view in horizontal section on an enlarged scale, taken substantially on the line 4—4 of FIGURE 3.
Figure 3:
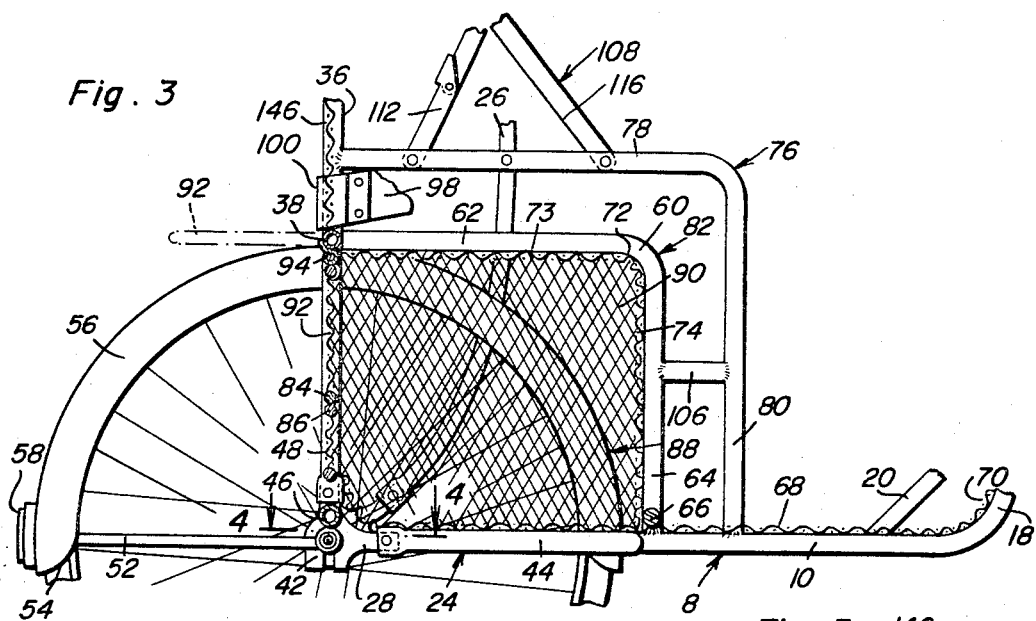
FIGURE 3 is a view in vertical longitudinal section.
Figure 5:
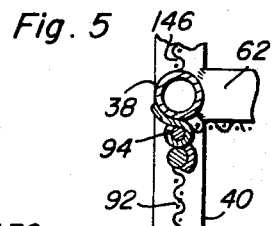
FIGURE 5 is a detailed view in vertical section on an enlarged scale through the compartment door or closure hinge.
Figure 6:
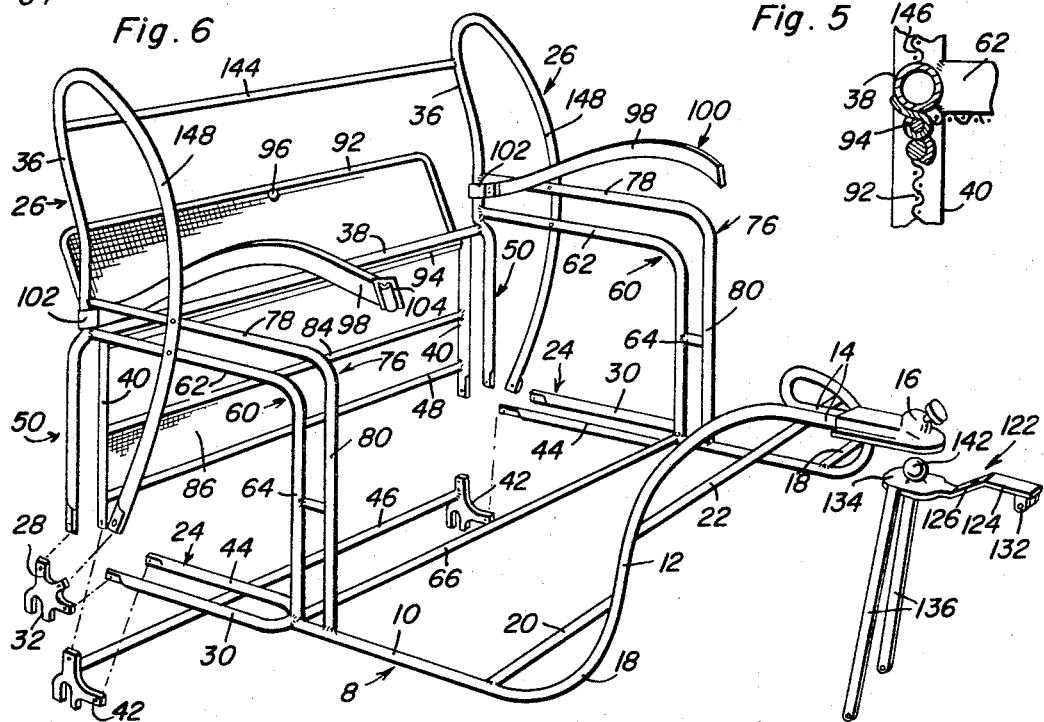
FIGURE 6 is an exploded perspective view of the frame structure and the hitch.

Referring now to the drawings in detail, it will be seen that the embodiment of the present invention which has been illustrated comprises a tubular frame structure of suitable metal which is generally designated by reference numeral 8. The frame 8 includes a pair of tubular side members 10 comprising upwardly and inwardly bent intermediate portions 12 terminating in forwardly bent, parallel side-abutting forward end portions 14 having mounted thereon a hitch socket 16. The bends 18 of the members 10 are strengthened by braces 20. A cross brace 22 extends between the intermediate portions 12 of the frame members 10. Horizontal forks or yokes 24 extend rearwardly from the rear ends of the members 10.

Substantially kidney-shaped tubular arms or wings 26 have their end portions secured by spiders 28 to the free end portions of the outer legs 30 of the forks 24. The spiders 28 include downwardly opening yokes or the like 32 which receive the end portions of downwardly removable axles 34. Retaining nuts 35 are threaded on the end portions of the axles 34. Extending between intermediate portions of the rear members 36 of the arms or wings 26 is a tubular across brace 38. Vertical members 40 depend from the end portions of the brace 38. Angle fittings or yokes 42 connect the lower ends of the vertical members 40 to the free end portions of the inner legs 44 of the forks 24. The angle fittings or yokes 42 are affixed to the end portions of a tubular transverse rod 46. Extending between the lower portions of the vertical members 40 is a tubular cross member or brace 48. The members 40, the end portions of the cross brace 38 and the lower portions of the members 36 provide what may be considered vertical yokes or forks 50.

Extending horizontally from the members 28 and 42 are rear yokes or forks 52. In the embodiment shown, rubber tired bicycle wheels 54 are mounted on the axle 34 for rotation in the forks or yokes 24, 50 and 52. Mud guards or fenders 56 are provided for the wheels 54. Reflector buttons 58 are mounted on the fenders 56.

Angular tubular seat supports 60 are mounted on the members 10 and 26. The supports 60 include upper horizontal portions 62 having one end affixed to the members 36 adjacent the ends of the cross brace 38. The supports 60 further include vertical portions 64 having one end affixed to the frame structure 8 adjacent the juncture of the members 10 and 24. A cross brace 66 extends between the lower end portions of the members 64.

Mounted on the frame structure 8 including the forks 24 is a floor panel 68. The floor panel 68 comprises an upwardly curved forward portion providing a dashboard 70. The floor panel 68, which is foraminous for lightness and low wind resistance, extends rearwardly to the cross member 48. Mounted on the supports 60 is a foraminous seat 72. The foraminous seat 72 includes a horizontal portion 73 affixed to the portions 62 of the supports 60 and a depending panel portion or apron 74 affixed to the portions 64 of said supports.

Handrails 76 are mounted on the frame structure in spaced parallelism with the support 60. The handrails 76 are angulated and comprise arms or the like 78 having one end affixed to intermediate portions of the members 36 of the arms or wings 26. The handrails 76 further include vertical portions 80 which provide assistance when entering or leaving the vehicle, said portions 80 having one end affixed to the members 10 adjacent the forks 24. It will also be seen that a foraminous seat structure 82 is provided having a capacity of two or more occupants.

In the embodiment shown, a cross rod 84 extends between the vertical members 40 in spaced parallelism with the cross member 48. A foraminous back panel 86 extends between the members 84 and 48. Thus, a luggage, etc., compartment 88 is provided below the seat structure 82, said compartment comprising foraminous end or side walls 90. A foraminous access door 92 is provided for the rear of the compartment 88 above the panel 86. The door 92 is suspended from the cross brace 38 by a piano-type hinge 94. A suitable latch may be provided for the door 92, as at 96. It will be noted that the door 92 swings downwardly by gravity to closed position.

The sections 98 of a safety belt 100 have one end connected, as at 102, to the members 36 of the arms or wings 26 between the members 62 and 78. The free end portions of the belt sections 98 are detachably and adjustably connected by a suitable buckle 104. Horizontal braces 106 extend between the members 64 and 80.

A foldable top 108 is removably mounted on the horizontal portions 78 of the members 76. In the embodiment shown, the top 108 includes a generally inverted U-shaped bow or the like 110 having its end portions detachably connected to the members 78. Vertical braces 112 support the bow 110 in an upwardly and rearwardly inclined position on the members 78, said braces also being detachably connected to said members. A generally U-shaped frame 114 is pivotally mounted on intermediate portions of the legs 116 of the bow 110. Breakable braces 118 support the frame 114 in an operative position on the bow 110. The top 108 further comprises a cover 120 of suitable flexible material mounted on the bow 110 and the frame 114.

The socket 16 constitutes the female member of a hitch 122 through the medium of which the frame 8 is connected to a conventional bicycle 123 for universal swinging movement. The hitch 122 further comprises an angulated bar 124 having in an intermediate portion thereof an opening 126 which receives therethrough the seat post 128 of the bicycle 123. The forward end portion of the bar 124 rests longitudinally on the bar 130 of the bicycle frame. A clamp 132 comprising depending ears secures the bar 124 to the bicycle frame bar 130. The bar 124 further includes an enlarged rear end portion or plate 134 having depending therefrom supporting legs 136 which receive the rear wheel 138 of the bicycle 122 therebetween and which are secured at their lower end portions to said bicycle as at 140. An upstanding ball 142 on the plate 134 is engageable in the socket 16 for coupling the trailer to the bicycle.

The seat structure 82 further comprises a transverse rod 144 extending between the upper portions of the members 36. Mounted on the rod 144, the members 36 and the cross brace 38 is a foraminous backrest panel 146.

It is thought that the use or operation of the trailer will be readily apparent from a consideration of the foregoing. Briefly, the riders grip the members 80 on either side of the vehicle and mount the floor 68 to occupy the seat 82 after which the safety belt 100 is fastened. With the device connected to the bicycle 123 through the medium of the hitch 122 said device may be pulled with a minimum of effort. The ball and socket connection provided by the hitch 122 permits universal swinging movement of the trailer relative to the bicycle. The construction and arrangement of parts is such that access may readily be had to the compartment 88 without disturbing the occupants of the seat 82. It will be noted that the tubular members 26 are in the form of open loops comprising legs 148 projecting forwardly from the members 36.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A trailer of the character described comprising a frame including a pair of spaced side members, a floor panel on said side members, supporting wheels on the frame, and a seat structure on the frame, said seat structure including a backrest comprising a pair of upstanding wings mounted on the frame, angulated supports having one end affixed to the frame and their other ends affixed to the wings, a seat panel mounted on said supports, angular hand rails mounted on the frame and the wings adjacent to and in spaced parallelism with the supports, and means for connecting the frame to a bicycle to be towed thereby.

2. The combination of claim 1, said frame further including horizontal forks on the side members straddling the wheels and operatively connected thereto, said wings comprising upstanding loops including vertical forks on one end straddling the wheels and connected to the horizontal forks and horizontal yokes straddling the rear portions of the wheels and connected to the forks.

3. The combination of claim 1, said side members comprising parallel side-abutting forward end portions, said connecting means including a hitch comprising a bar having one end portion secured longitudinally on the rear portion of the bicycle frame and extending rearwardly therefrom, supporting legs on the rear end portion of the bar, a socket on the forward end portions of the side members, and an upstanding ball on the rear end portion of the bar engaged in the socket.

4. The combination of claim 3, said bar having an opening therein receiving the bicycle seat post therethrough.

5. A trailer of the character described comprising a frame including a pair of spaced side members, a floor panel on said side members, supporting wheels on the frame, and a seat structure on the frame, said seat structure including a backrest comprising a pair of upstanding wings mounted on the frame, angulated supports having one end affixed to the frame and their other ends affixed to the wings, a seat panel mounted on said supports, angular hand rails mounted on the frame and the wings adjacent to and in spaced parallelism with the supports, and means for connecting the frame to a bicycle to be towed thereby, said floor panel extending rearwardly beneath the seat panel, said seat panel including a vertical front portion depending to the floor panel and defining a luggage compartment in conjunction therewith.

6. The combination of claim 5, and a vertical panel on the lower portions of the wings providing a back wall for the compartment.

7. The combination of claim 6, said vertical panel being spaced below the seat panel for providing an access opening to the compartment.

8. The combination of claim 7, together with a door for the opening hingedly suspended on the wings.

9. The combination of claim 8, all of the panels being foraminous for lightness and low wind resistance.

10. The combination of claim 9, said seat structure further including a foraminous backrest panel extending between the wings.

References Cited by the Examiner

UNITED STATES PATENTS

| | | | |
|---|---|---|---|
| 577,826 | 2/1897 | Millar | 280—282 |
| 624,678 | 5/1899 | Planes | 280—204 |
| 947,945 | 2/1910 | Sampson | 280—204 |
| 2,212,958 | 8/1940 | Rea | 280—204 |

FOREIGN PATENTS

| | | |
|---|---|---|
| 906,037 | 5/1945 | France. |
| 71,361 | 6/1943 | Norway. |

KENNETH H. BETTS, *Primary Examiner.*